F. S. BUCK.
LAST LATHE.
APPLICATION FILED APR. 24, 1919.

1,407,727.

Patented Feb. 28, 1922.
12 SHEETS—SHEET 1.

INVENTOR-
Frank S. Buck
By his Attorney
Nelson W. Howard

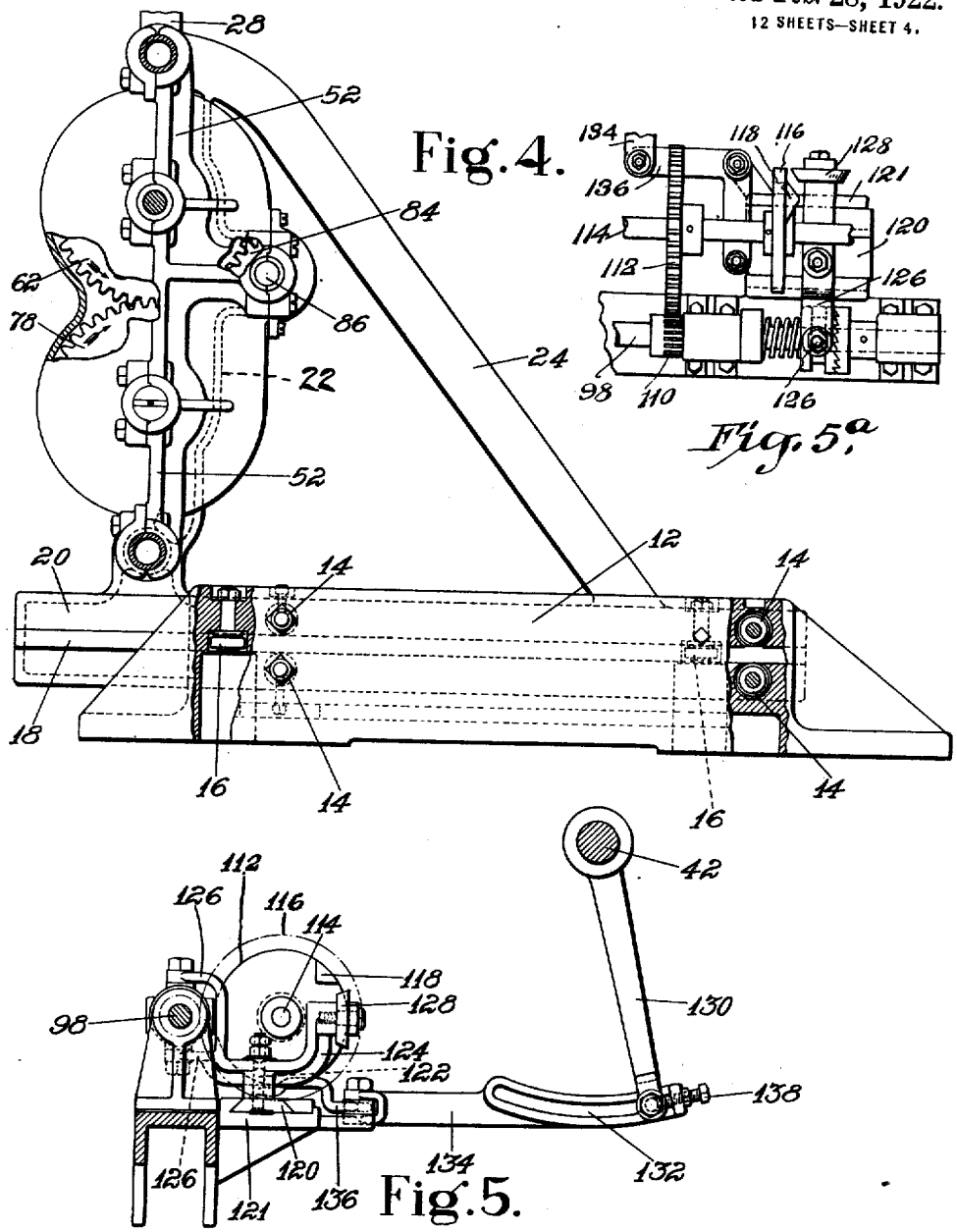

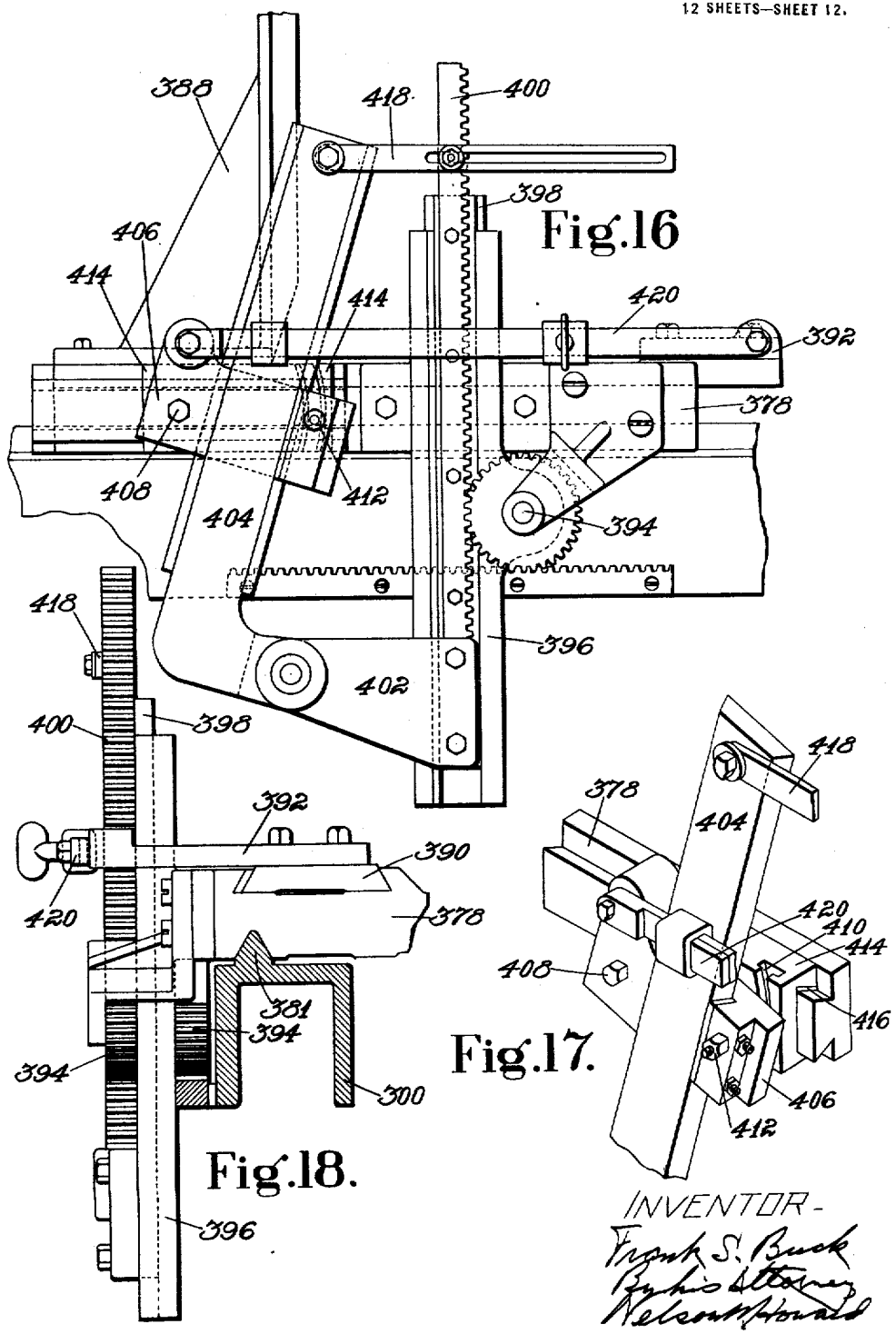

UNITED STATES PATENT OFFICE.

FRANK S. BUCK, OF SPRINGFIELD, VERMONT, ASSIGNOR TO FITZ-EMPIRE DOUBLE PIVOT LAST COMPANY, OF AUBURN, MAINE, A CORPORATION OF MAINE.

LAST LATHE.

1,407,727.          Specification of Letters Patent.      Patented Feb. 28, 1922.

Application filed April 24, 1919. Serial No. 292,280.

*To all whom it may concern:*

Be it known that I, FRANK S. BUCK, a citizen of the United States, residing at Springfield, in the county of Windsor and State of Vermont, have invented certain Improvements in Last Lathes, of which the following description, in connection with the accompanying drawings, is a specification, like reference characters on the drawings indicating like parts in the several figures.

This invention relates to machines for producing articles having a systematic resemblance to a pattern and is herein disclosed as embodied in a last lathe. It should be understood, however, that the invention, especially in some aspects, is not limited to this particular type of copying machines, or indeed, to machines for producing solid objects.

Prior to the development of machines embodying the present invention, shoe lasts have been cut in last lathes having a swinging frame with provision for cutting one last at a time. It had long been recognized that a machine which would cut two lasts at once would cut down by nearly 50% the floor space and time necessary to produce a given output of lasts, and machines for cutting two or even more lasts at once have been proposed, but until the machines of the present invention were developed, none had ever been even practically developed, because none of the proposed forms gave sufficient promise of securing the meticulous accuracy required in commercial last cutting. For example, a last which is inaccurate by as much as $\frac{1}{32}$ inch in a dimension is rejected, and any substantial number of errors as large as $\frac{1}{64}$ inch will cause the rejection of a whole order of lasts.

Much of the inaccuracy occurring in last cutting is due, among other causes, to vibration and jar, and to lack of stiffness in the parts. The movement of the oscillating frame which carries the model and block is governed by the model wheel, the pressure from which has to stop and reverse the direction of the movement each time the model and blocks revolve. This jars the machine and causes the cutters to cut inaccurately in the block. Any lack of stiffness in the swing frame will also cause inaccurate cutting. The making of the parts abundantly stiff to eliminate difficulty due to distortion of the swing frame increases the weight so much as to cause an absolutely prohibitive amount of jarring. It is therefore impossible to make any change in design which will either increase or decrease the weight of the moving parts beyond a certain mean value.

The heavy cutter head used on last lathes prior to the invention described in my Patent No. 1,137,117 was another source of trouble. The old cutter head was several times the diameter of a last, and consisted of a heavy base on which were mounted several hook-shaped cutters. When run at high speed, such an organization is practically impossible to balance dynamically, because among other characteristics, it is not symmetrical with regard to any axis, the different roughing cutters and the finishing cutters being of different sizes and shapes. Such a construction in itself gives rise to much vibration.

The problem of the "double lathe" seems at first sight a simple one, and many solutions have been suggested, none of which, however, has promised sufficient practical possibilities to warrant embodiment in an actual machine.

My invention, above mentioned, pointed the way to a solution. By it I am enabled to reduce the diameter of the cutter head from ten inches to three and one-half inches or even less. While this reduction in size was made originally to insure accurate reduplication of a model having sharp concavities which was one of the main objects of the invention of the patent referred to, I was later also led to investigate the question whether the reduction in size might not be an important factor in permitting construction of a machine which would handle a model and two blocks without increasing the size and mass of the moving parts to such a degree as to cause prohibitive sluggishness and jar. The use of two cutter heads rather than one is necessary in order to produce the proper reaction between the cutter and the block. It has been proposed to cut a right and left last simultaneously with a single cutter head of the old ten-inch type. This gives rise to the difficulty that the line of shear between the cutter and the block is not perpendicular to the line of relative movement of the cutter and block so that the cutter tends to pull one block into itself. To those skilled in the art it is well known that it is not good practice to feed work in the direction of cut because the jerk and hogging of the cutter makes the work imperfect and gives rise to vibration and consequent rough performance everywhere in the machine. I have found that two cutter heads are necessary in order to avoid this difficulty, and have been able to get the moving parts into compact form and thus avoid weight and secure stiffness by the application of my invention above noted, to the problem. This novel combination is an important feature of my invention.

It is necessary when a left last is to be cut from a right model that the block and model approach the cutter and model wheel, respectively, in a straight line. Any departure from this produces a twist in the work and the twist is in the same direction in both the right and left lasts which will therefore fail to be accurate "reflections" by double the amount of the twist. I have therefore advantageously combined a rectilinearly sliding frame with the double cutter head construction, the direction of slide being preferably parallel to the planes containing the respective blocks and cutters.

My invention also comprises a novel length grading mechanism which is an improvement upon that shown in my Patent No. 1,302,303, granted Apr. 29, 1919. The invention of this patent secured mathematical accuracy of grading by means of a rectilinear sliding action. I had embodied the invention first in a boot tree lathe in which it gave entire satisfaction. I found, however, when I came to cut lasts with it, that the reaction between the cutter and model wheel and the steeply sloping surfaces of the block and model caused a certain amount of longitudinal jerk in the movements of the carriage due to an unavoidable slight amount of backlash in the slide, which was approximately parallel to the direction of movement of the carriages and that the work would fail to grade properly over the interval covered by the jerks, this interval being several times the amount of the looseness, where a small grade was being made. I found also, in using the mechanism of the patent when a very slow grade was being made on a block having room only for a very short front stub, that any great amount of back lash in the slide might fail to be taken up before the toe tip was reached. The present invention removes even the possibility of these difficulties by providing what is in effect a wedge in the connecting means between the cutter and model wheel carriages. Preferably I arrange this wedge so that its line of travel is transverse to that of the carriages so that any backlash in its slide must be taken up before the carriages have traveled more than .01 inch. The rectilinear sliding wedge faces secure the advantage of mathematically perfect grade obtained by the prior invention, and avoid the development of any possible difficulty due to wear and looseness of the parts.

These and other features of the invention, comprising various combinations and arrangements of parts will be understood from the following description of two embodiments of the invention, selected for purposes of illustration and shown in the appended drawings, in which Fig. 1 is a front elevation of the essential parts of the machine;

Fig. 4 is an end elevation of the slide frame;

Fig. 5 is a detail of the drive mechanism;

Fig. 5a is a plan of the mechanism shown in Fig. 5;

Figs. 16, 17 and 18 are details of the grading mechanism.

Figure 1:
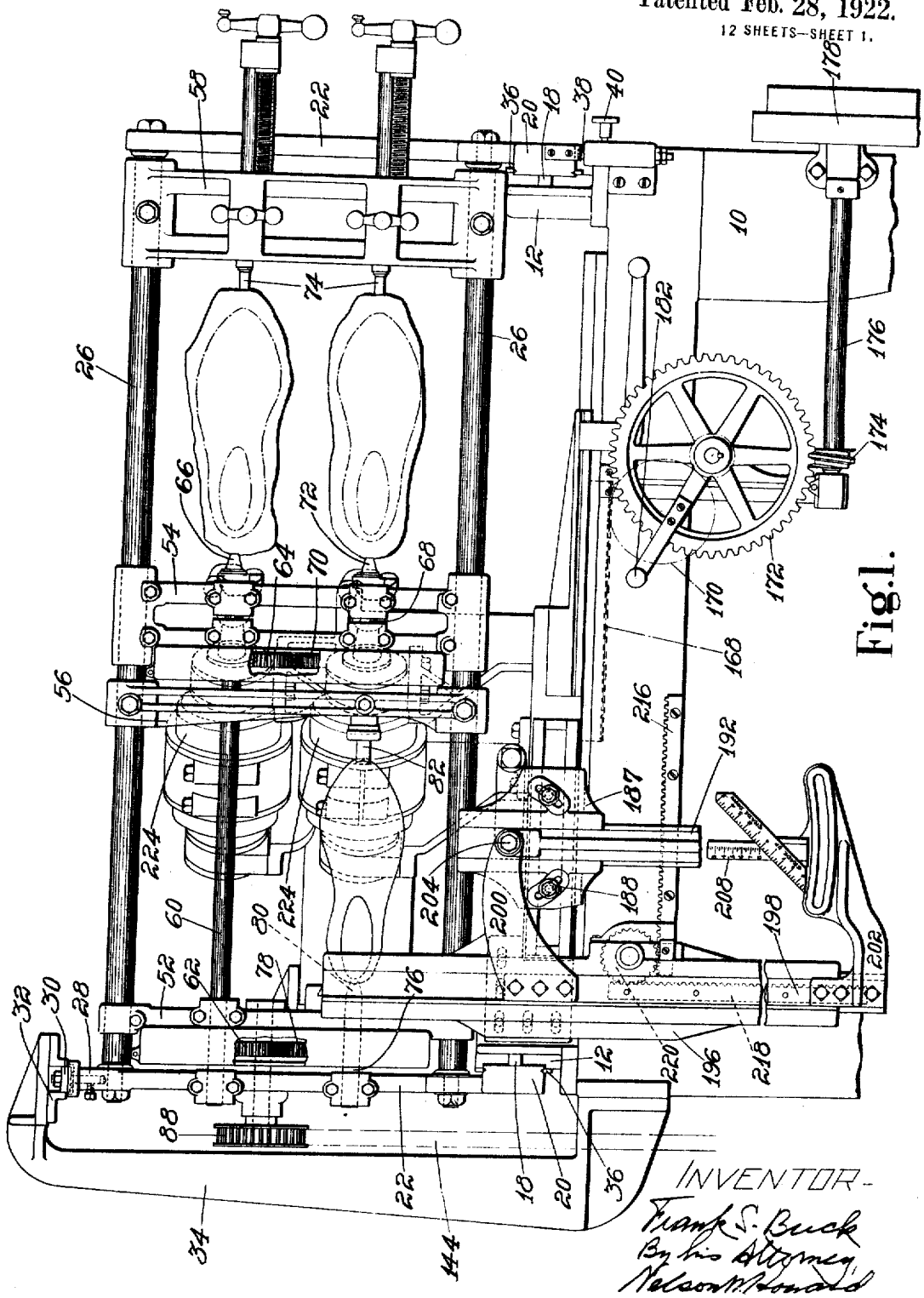

The main frame 10 is provided at its top with two guides which are parallel and extend and slope downwardly from front to rear. These guides each comprise two sets of vertically acting roller bearings 14 and two laterally acting roller bearings 16, one set of each near each end of the guide. These bearings co-act with ribs 18 on the lower frame members of the slide frame, which will now be described. The relation between the main frame and the slide frame may be otherwise contrived, but the form shown is a good practical one.

The slide frame is formed of two bars 20 which carry the ribs 18. Mounted on the bars are the verticals 22, which are braced to the bars 20 by diagonals 24. The members 20, 22, and 24 comprising each end frame of the slide frame are preferably cast in one piece. These end frames are joined by two bars 26 near the top and bottom, respectively. The left hand member 22 is shown with an extension 28 carrying a roller 30 which runs in a guide 32 at the upper end of an arm 34 which is firmly fastened to the main frame. The guide 32 is bi-lateral so that it supports the slide frame against distortion in the plane of the bars 26. Suitable dust guards, preferably of felt, are placed at 36, between the slide frame and the guides 12.

Figure 2:
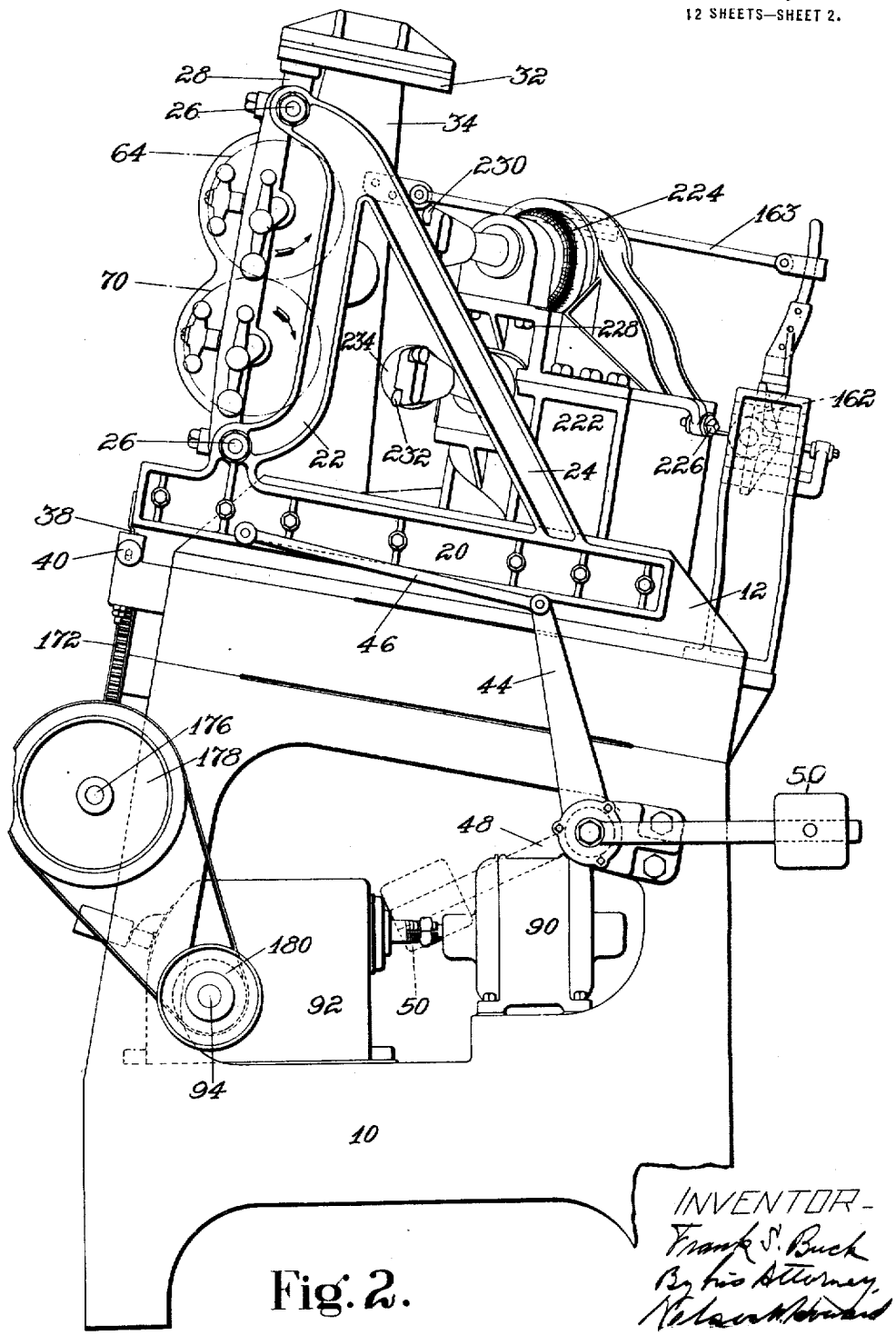
Figs. 2 and 3 are end elevations.
Figure 3:
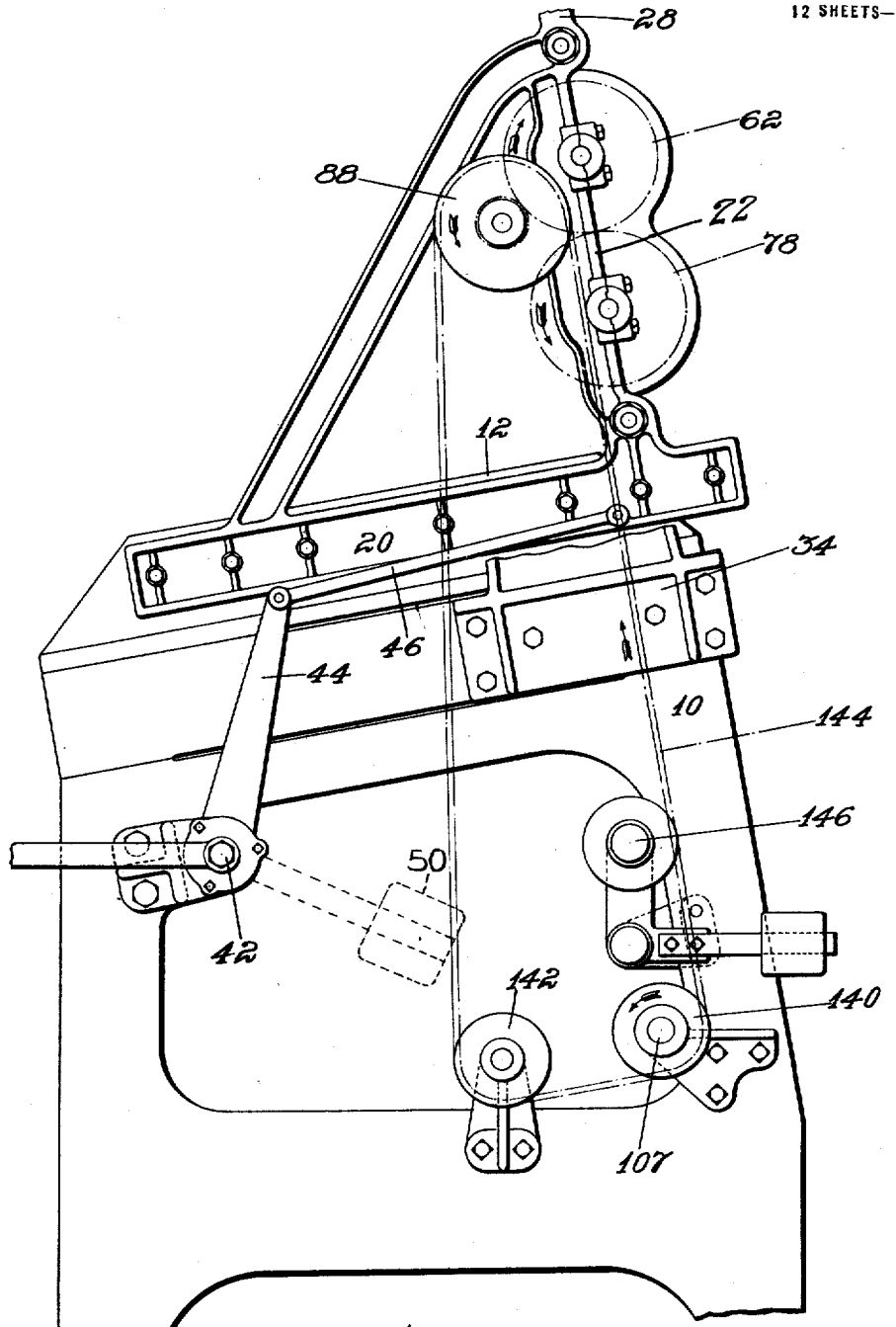
Figure 9:
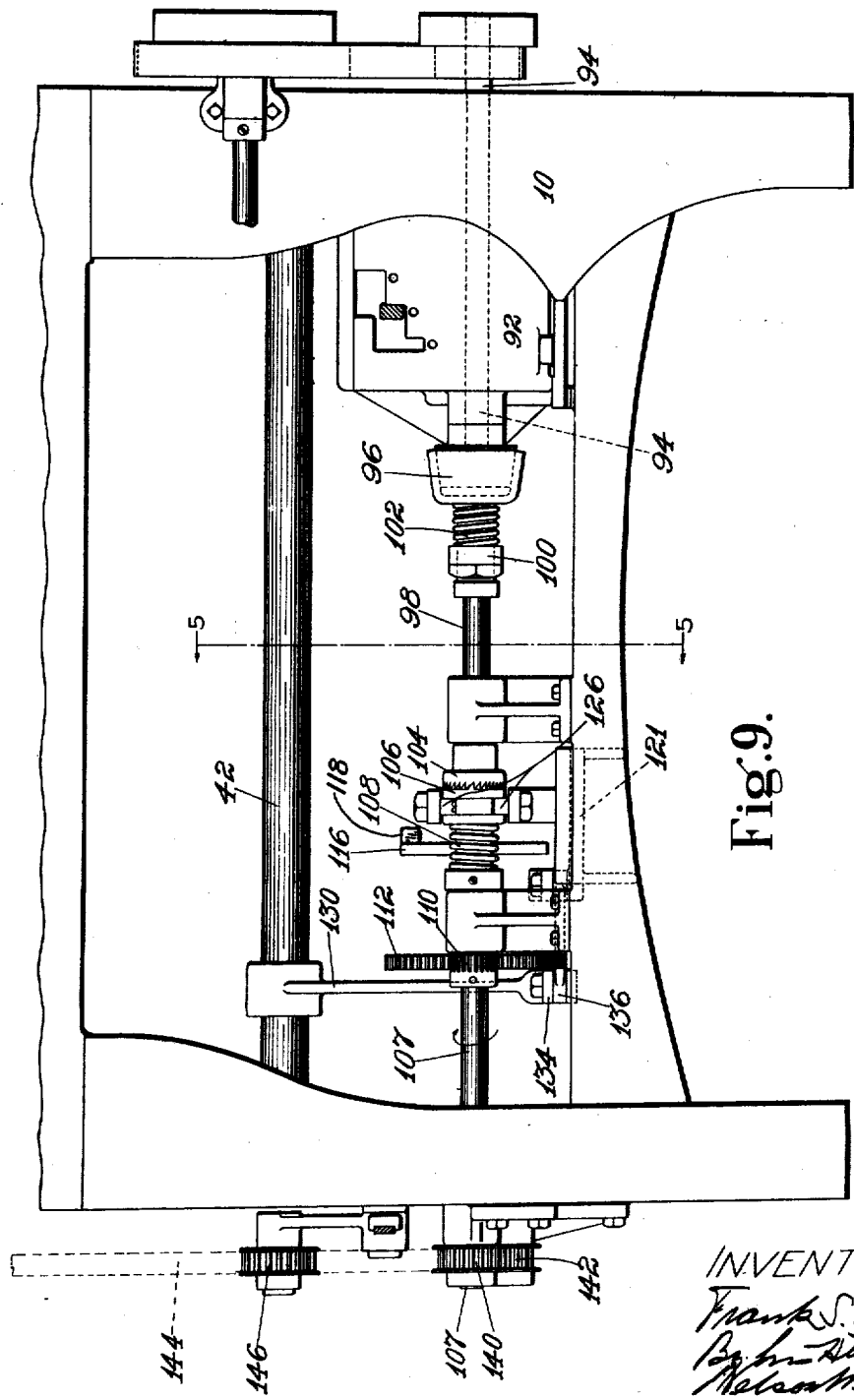
Fig. 9 is a detail of the drive mechanism.

Owing to the inclination of the guides 12 the slide frame has always a tendency to slide downwardly toward the rear of the machine. It is held in its extreme forward position, when desired, for the purpose of clamping the work, for example, by a suitable latch 38, Figs. 1 and 2 operated by a handle 40. A rockshaft 42, Figs. 3, 5 and 9 is mounted in the main frame and carries two crank arms 44 extending upwardly toward the slide frame. The upper ends of these crank arms are linked by links 46 Figs. 2 and 3 to the bars 20, respectively. The slide frame is thus preserved against distortion in the plane of the bars 20. The shaft 42 has a third crank arm 48 which carries a counterweight 50. This arm can be arranged either before or behind the shaft 42, as indicated by full and dotted lines Fig. 2, so that the counterweight will tend to impel the slide frame either up or down the inclined way 12 as desired. In the preferred construction the incline is such that the downward tendency of the slide frame under the influence of gravity will produce the maximum pressure required between the model wheel and model, in order that the counterweight may be eliminated. The elimination, or at least, the diminution of the counterweight, diminishes by so much the mass which has to be suddenly reversed in movement upon each revolution during the cutting, and obviates to that extent the jar on the machine. This reversal of movement is produced by the action of the model wheel on the model at a heavy mechanical disadvantage, and much of the roughness in last cutting results from the vibration thus produced. The adjustable arm and counterweight permit the modification of the gravitational effect in any desired manner.

Mounted on the bars 26 are the head stock frames 52, 54, and the adjustable tail stock frames 56, 58. A shaft 60 extends between the frames 52 and 54, and has gears 62, 64 near its ends. At its inner end is mounted the block driving dog 66. A stub shaft 68 is mounted in the frame 54 below the shaft. This carries a gear 70 meshing with the gear 64, and a second block driving dog 72. The frame 58 carries two corresponding block dead centers 74 of ordinary construction. The frame 52 carries a stub shaft 76, on which are mounted the gear 78 meshing with the gear 62, and the model driving dog 80. The frame 56 carries the model dead center 82 of ordinary construction. The model and blocks are driven by a gear 84, Fig. 4, which meshes with the gear 62 and is mounted on a stub shaft 86 mounted in the frame 22, and carrying a sprocket 88 on its outer end. The gears 62, 78, 64, 70 are all of the same size, so that actuation of the sprocket 88 will drive the model and lower block in one direction and the upper block in the other direction at the same speed.

The driving mechanism will now be described. A motor 90, Fig. 2, is directly connected to a change gear box 92 which transmits motion to a shaft 94, Fig. 9, connected by a cone friction clutch 96 with a shaft 98. The cone clutch may be adjusted by the nuts 100, working against the spring 102. The shaft 98 carries fixedly mounted thereon the toothed clutch member 104 which co-operates with a second toothed clutch member 106 normally held in engagement with the clutch member 104 by a spring 108 and splined on a shaft 107 co-axial with the shaft 98. The shaft 98 carries a gear 110 which drives a gear 112 on a shaft 114, Fig. 5, which carries also a disk 116 having a cam 118 on its face. A slide 120, Fig. 5 in a bracket 121 carries a stud 122 on which is mounted a lever 124 having a fork 126 at one end to control the splined clutch member 106, Fig. 9, and a cam roller 128 at the other. The parts are so proportioned that the disk 116 normally revolves without engagement between the cam 118 and roller 128, but if the slide 120 is moved in one direction or away from the reader in Fig. 5, and held there, the cam 118 will move the lever 124 and disconnect the members 104 and 106 whereupon the shaft 107 will stop.

The shaft 42, Figs. 5 and 9, has a fourth crank arm 130 the ends of which, during the last cutting, works in an arcuate slot 132 in a bar 134 the forward end of which is pivoted to one end of a bell crank lever 136 pivoted on the bracket 121, the other arm of which is pivoted on the slide 120. When the slide frame is pulled out to latching position, the shaft 42 is rotated, carrying the arm 130 back against the adjustable stop 138 in the slot 132, Fig. 5, and pulls back the bar 134. This operates the bell-crank and throws the slide 120, so that the shaft 107 will stop when the cam 118 reaches the roll 128.

The shaft 107, Figs. 3 and 9, has at its outer end a sprocket wheel 140, around which and sprocket wheel 142 and the sprocket wheel 88 runs a chain 144, kept taut by a tightener 146. The gearing is so proportioned that the shaft 107 rotates an integral number of times while the gear 78 rotates once, so that the model and work driving dogs will always be stopped in the same position, which will facilitate the insertion and removal of the model and blocks.

Figure 6:
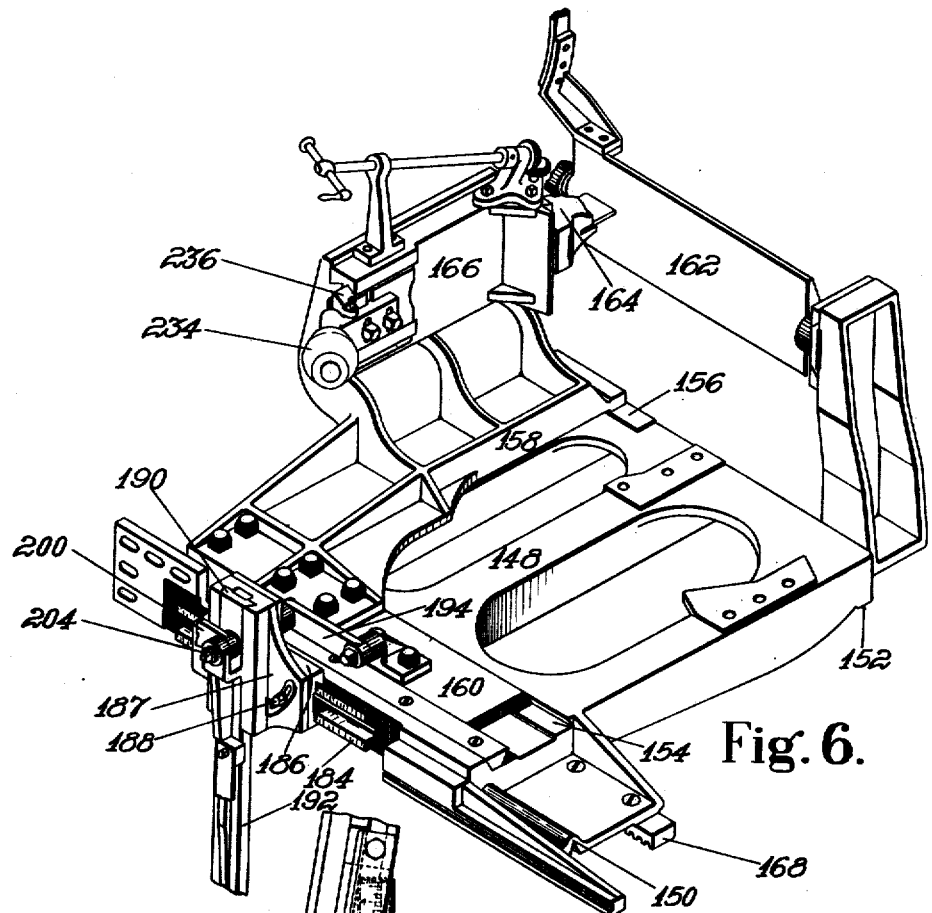
Fig. 6 is a perspective view of the carriages.

The cutter carriage 148, Fig. 6, is formed with V and flat guides 150 and 152 arranged to engage a rib and a flat on the main frame, as is usual in machines of this class. The carriage has on its upper surface a dovetail guide 154 and a flat guide 156. The model wheel carriage 158 slides on the guide 156 and has an extension 160 which runs in the guide 154. The width grading mechanism, comprising the fan board 162, vertically adjustable feeler 164, and slide 166 is of ordinary construction.

The cutter carriage has on its lower face a rack 168 driven by gearing 170, 172. The worm wheel 172 is driven by the worm 174 on a shaft 176 having a cone pulley 178 driven from a cone pulley 180 on the shaft 94. The shaft 176 is raised and lowered in the ordinary manner to engage and disengage the worm 174 and worm wheel 172, and is automatically dropped when the cutter carriage has moved to its leftmost extremity of movement. This mechanism is well-known to users of the Gilman lathes and need not be further described. The handle 182 is used to run the cutter carriage back and forth rapidly when the gearing 172, 174 is disconnected.

Figure 7:
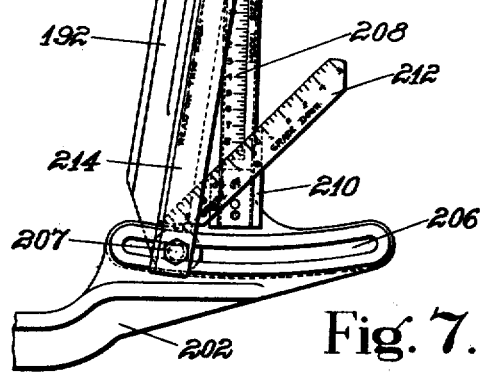
Fig. 7 is a detail of the grading mechanism.

The cutter carriage carries a dovetail 184 Fig. 6 on which works a slide 186. Pivoted on this slide is a block 187, which can be angularly adjusted about the pivot by the bolts and segmental slots 188. The block 187 has a dovetail guide 190 in which works a grade bar 192. The block 186 is joined to the model wheel carriage by a link 194. Fixedly mounted on the cutter carriage is a dovetail guide 196 Figs. 1 and 7 in which works a vertical bar 198 carrying two arms 200 and 202 extending toward the grade bar. The arm 200 is pivoted to the grade bar at 204 and the arm 202 has an arcuate slot 206 about 204 as center in which the lower end of the grade bar can be adjustably secured by a clamp 207, Fig. 7. The arm 202 carries a scale 208 the reading edge of which is parallel to the bar 198 and is collinear with the center 204. The scale 208 is arranged to carry an adjustable slide 210 which carries a scale 212 at an angle of 45° with the scale 208 and with its zero point always on the reading edge of the scale 208 whatever its adjusted position. The grade bar 192 carries a blade 214 whose reading edge is parallel to the grade bar and is collinear with the center 204.

A horizontal rack 216, Fig. 1, is mounted on the main frame, and a second rack 218 is mounted on the vertical bar 198. A pinion 220, mounted on the guide 196 connects these two racks. As the cutter carriage is driven to the left as seen in Fig. 1, the bar 198 will be lowered vertically at the same velocity, while being carried horizontally by the carriage. If the grade bar 192 has been set in non-parallelism with the vertical bar the vertical movement of the system will cause the slide 186 to move relatively toward or from the guide 196 by an amount equal to the product of the travel of the bar 198 and the tangent of the angle of adjustment of the grade bar measured from the mean position of the reading edge of the scale 208.

This relative movement of the slide and the guide 196 will, through the link 194, move the model wheel carriage on the cutter carriage by the same amount, and thereby accomplish a length grading action on the last being cut. The relative travel of the two carriages per inch travel of the cutter carriage is equal to the offset or departure of the grade bar from its mean position per inch measured along the mean position.

The grading mechanism may be otherwise contrived, and another form will be described, but the form shown is strong, practical and smoothly working, and has performed satisfactorily in practice. If the guide 196 were mounted on the model wheel carriage the offset of the grade bar per inch would equal the relative travel of the carriages per inch travel of the model wheel carriage. The system 198, 192, 200, 202 is a rigid one, when once adjusted, and acts as a wedge between the two carriages, the term "wedge" being used herein in the sense of two relatively inclined planes used either to separate or to bring together the objects engaging them respectively. It is obvious that the grading action will be absolutely uniform. The fact that the wedge forms part of the connection between the carriages and moves transversely to their line of travel enables all lost motion in the connections to be taken up in the first 0.01 inch of cutting, so that any irregularity due to mechanical imperfections of adjustment will disappear while the stub at the end of the last is being cut, and the last itself will be graded perfectly.

An important feature of the machine, not, however, my invention, resides in the mechanism for setting the grade bar. The absolute amount by which any grading device is to be set depends upon the absolute size of the model used, since the grading of (for instance) ⅛ inch in length per size requires different magnification ratios corresponding to different model lengths. In the old Gilman and in the Kimball Bros. & Sprague lathes the length of the grading lever is changed by moving its pivot vertically, so that the same grading scale can be used for models of different lengths. The adjustments are difficult to make, and more or less "jockeying" is always necessary when a new model is placed in the machine. All such difficulties have been avoided by the novel setting mechanism provided in this machine.

The scale 208 is graduated in units of size measurement according to the ordinary system in use in this country, but is calibrated in units 1½ times as large. That is, the distance between the 6 and 7 marks, for example, is ⅜ inch instead of ¼ inch. The scale 212 is graduated in units of ordinary length grade, up and down, and is calibrated in $\tfrac{1}{3}\sqrt{2}$ inches. The scale 208 is so located vertically that the distances from the pivot 204 to its graduation marks are all 1½ times the actual or "stick" lengths of the lasts corresponding to the graduations. That is, the #4 child's last is 5.271 inches long and the distance from the pivot 204 to the corresponding graduation mark is 7.906 inches. Any other multiplier K greater than 1, would do, provided only that the apparatus is large enough to permit satisfactory operation. In other words, it is the angle and not the length of the wedge which effects the desired result.

Figure 8:
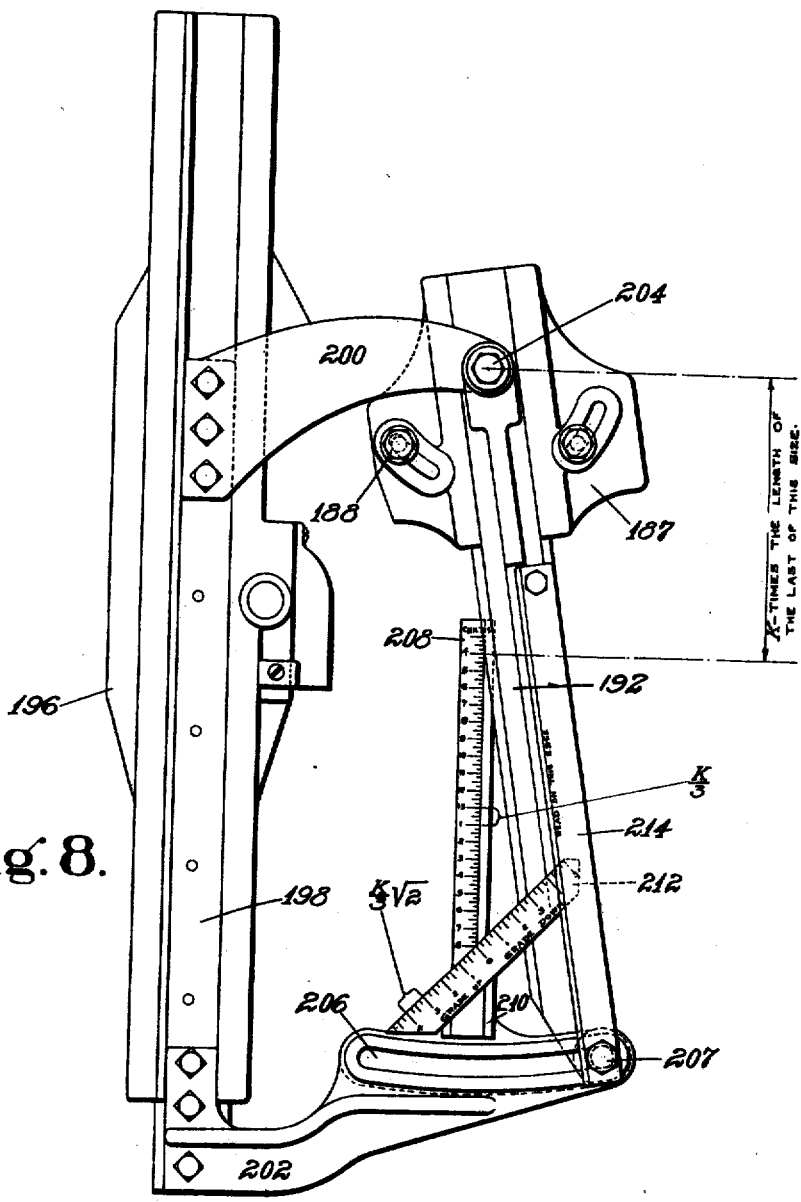
Fig. 8 is a complete detail showing the grading mechanism.

Suppose it is desired to grade down 4½ sizes from an 8 men's model. See Fig. 8. The scale 212 is moved so that its zero mark coincides with the 8 men's mark on scale 208 and the bar 192 is swung to the right so that the reading edge of the plate 214 is over the 4½ mark on scale 212. Now this 4½ mark is exactly horizontally opposite the 3½ mark on scale 208 owing to the $\sqrt{2}$ factor used in the graduation of scale 212, and the 45° angle on which it is set. Furthermore, this 4½ mark is offset to the left of the 3½ mark by exactly 2.25 inches, or 4½ sizes as measured on the scale 208, owing to the same reasons. Therefore, while the cutter carriage (and the wedge system, vertically) travels the length of a #3½ (i. e. ⅔ of the distance from the point 204 to the 3½ mark of scale 208) the model wheel carriage will be relatively pulled forward by an amount equal to ⅔ of the distance between the 4½ mark on scale 212 and the 3½ mark on scale 208, or 1.5 inch. In other words, the model wheel carriage will travel the length of an 8 while the cutter carriage travels the length of a 3½, which is the result desired.

It should be understood that the above discussion refers to lasts having the actual lengths shown on the regular last stick. If the last is of a pointed toe style, the measurement of the last on the stick will be actually longer than its marked length. This is why an "8 men's model" was selected for illustration. This #8 model would be marked #7, which is the men's model size, and would have the size 7 foot room in it, but its pointed toe would "extend" it ¼ inch, and all lasts of the set would "stick" one size longer than their marked lengths.

Thus the single graduation scale suffices to set the grade bar for any model. Its setting to the model length is simple, and as no stress comes upon it, no bolts have to be loosened and tightened. The setting of the scale 212 can be read by putting the model on the last measuring stick. If the vertical movement of the wedge were governed by the model wheel carriage, the scale 212 would be at right angles to the scale 208 and the $\sqrt{2}$ factor would be omitted in its calibration. Its adjustment and use would be the same.

The axis of the guide bar passes through the pivot between the block 187 and the slide 186. The automatic stop mechanism is preferably arranged to bring the pivot 204 in line with this pivot at the instant of stop. The grade bar can then be swung to a new adjusted position without moving the slide 184, whereas if adjustment be made when the two pivots are vertically separated, the angular movement of the bar will cause a movement of the slide 186, and consequently of the model carriage.

The cutter carriage carries a frame 222 in which are mounted the stators of two motors 224. Suitable provision is made for relative horizontal and angular adjustment of their axes, as for example, by the screws 226, 228. The axes of the stators lie in planes parallel to the plane of the guides 12, and passing through the axes of the block holding means, and are placed at an angle of about 30° with these axes respectively. The motor rotors have "small" cutter heads 230, 232, of approximately 3½ inches diameter. The relation of the cutter to the blocks is in accordance with the principles set forth in my Patent No. 1,137,117. The model wheel 234 is vertically adjustably mounted on a slide 236 which is adjustable in the slide 166. Its axis is similarly situated with relation to the axis of the model holding means. It has been found advantageous to run the motors on 120 cycle current, which can be obtained through a frequency changer obtainable from the General Electric Company and the rotors will then revolve it about 7200 R. P. M. The direct motor drive eliminates all vibration due to belt trouble. The double cutter construction is an exceedingly important feature of the invention. Each cutter is so located that its point of contact with the block is in the plane of movement of the block axis, as the slide frame moves back and forth. This insures that the direction of cut is perpendicular to this plane and all tendency to drag the work into the cutter with its consequent digging and vibration, which would give rise to serious difficulty if it were attempted to use a single cutter between the blocks, is avoided. These cutter heads revolve oppositely to the blocks they respectively engage. The rotational feed of the blocks is therefore likewise opposite the direction of cut, so that any vibration due to backlash in the gears is avoided. This feature, however, is not my invention.

The practical success of the machine is also due largely to the compactness secured by the "small cutter head" construction. In the machine just described, the distance between block centers is about 7½ inches. This compactness reduces the weight of the oscillating parts, with the consequent elimination of the vibration and jar due to the sudden reversal of movement of a larger mass.

The distance mentioned is as close as two rough last blocks can be conveniently hung to rotate past each other and permit the necessary handling. It would of course be impossible to work two of the old ten-inch cutters nearly so close together.

Figs. 10–18 illustrate another form of machine embodying features of the present invention. The main frame 300 carries the side arms 302, in which are the guides 304 for the slide frame. These guides comprise a set of vertical and horizontal roller bearings on each end of each side of the swing frame, such as, for example, those illustrated in Figs. 13 and 14, where the rollers 306 are shown as co-operating with a rib 310 mounted on or secured to the slide frame 308. The slide frame 308 comprises two end plates 312 and 313 preferably cast in one piece, and comprising a vertical member 314, horizontal member 316 (carrying the rib 310), and diagonal braces 318. The horizontal member 316 is mounted between the ends of the vertical 314. The verticals 312 and 313 are joined by bars 320, Fig. 12, which are joined by a third vertical 322. This is jointed to the right hand vertical 313 by intermediate horizontals 324. Diagonal braces 325 are inserted to stiffen the frame. Three adjustable drive centers 326 are mounted in the three panels thus formed, as will be well understood from Figs. 11 and 12. The block drive spindles 328 and the model drive spindle 330 are mounted in the verticals 322 and 312, and driven by the gears 332, 334, 336, respectively. Two intermediate gears 338 are provided so that all three spindles can be driven in the same direction, or either or both of the block spindles can be driven oppositely to the spindle 330, by properly shifting the gears. The gear system is driven by a pinion 340 on a shaft 342, Figs. 11 and 13, on the outer end of which is a pulley 344 driven by a belt 346 which passes over idlers 348, 350 and the drive pulley 352, connected with the main drive pulley 354 by the belt 356, pulley 358, shaft 360, pulley 362, belt 364, pulley 366, shaft 368, pulley 370, belt 372, pulley 374 and shaft 376, as will be understood from Fig. 10.

The cutter carriage 378 slides on ways 379, 381 on the main frame 300, and is driven in the ordinary manner by the pulleys 358, 380, 382, 384, and the ordinary gearing 386, as is familiar to all skilled in this art. The model wheel carriage 388 slides upon it as in the previously described machine, is dovetailed into it at 390, and carries a plate 392 extending out at the back of the machine. It also carries a bracket and pinion 394, and a slideway 396 in which moves vertically the slide bar 398, on which is a rack 400, co-operating with the pinion 394. The bar 398 has an arm 402 to which is pivoted the grade bar 404 dovetailed into a block 406 which is pivoted at 408, and clamped by the slot 410 and bolt 412, to a slide 414 dovetailed to the cutter carriage at 416. The upper end of the grade bar is connected to the bar 398 by a slotted link 418. The block 406 is connected to the plate 392 by the adjustable link 420. The setting scale is omitted, for the sake of clearness of illustration, but the operation of the grading mechanism will be understood from what has gone before as the action is entirely similar.

Figure 10:
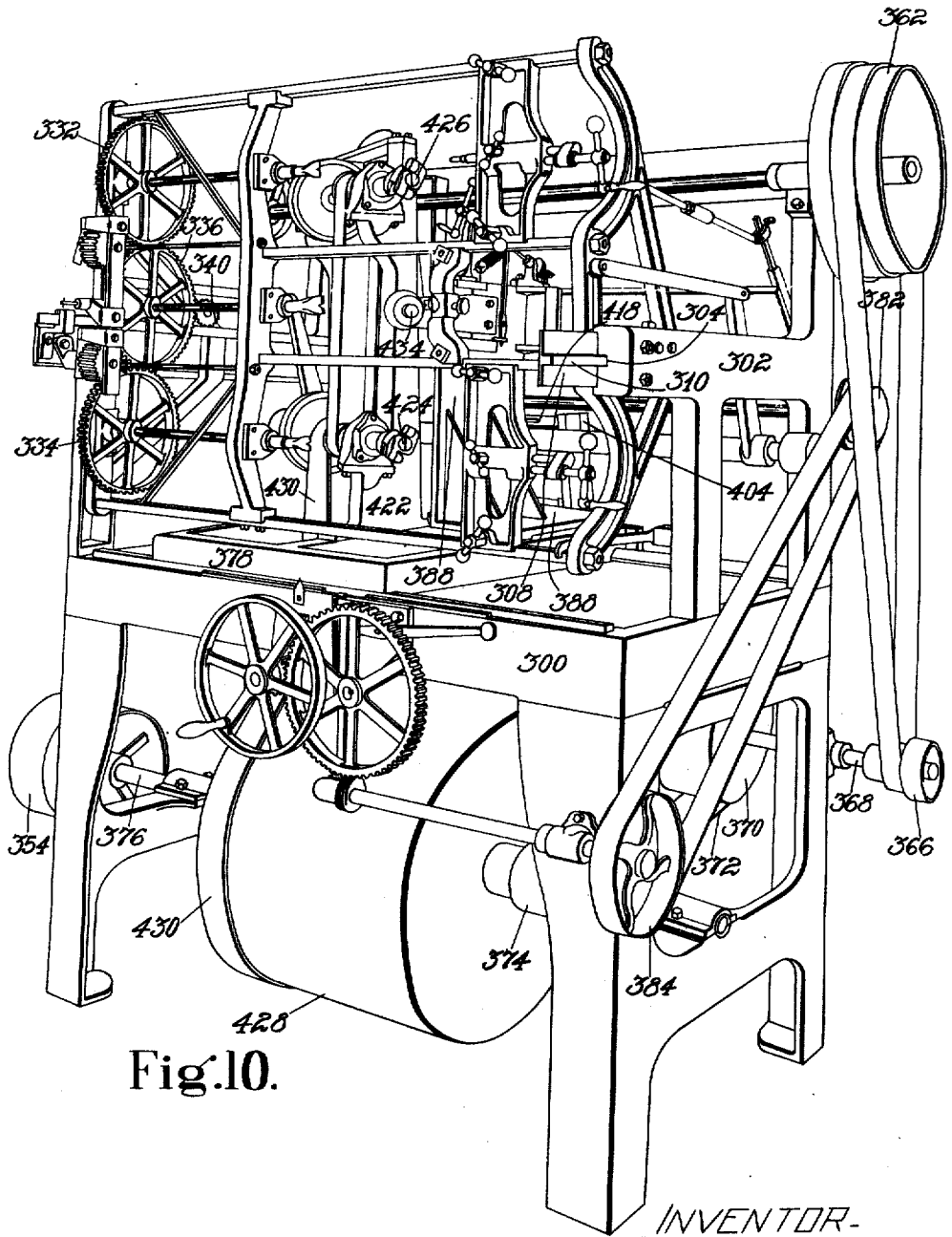
Fig. 10 is a perspective of another machine.
Figure 11:
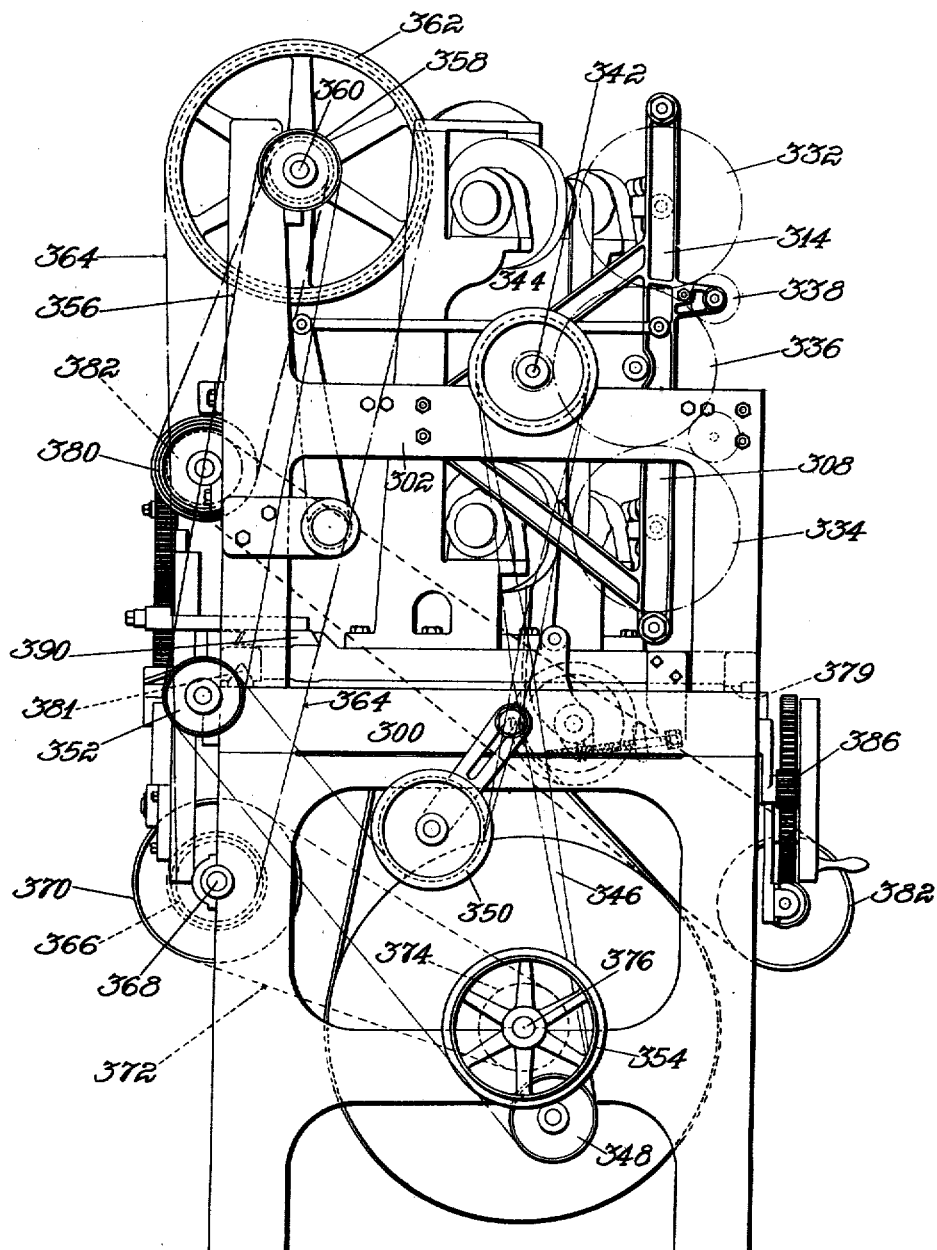
Fig. 11 is an end elevation.
Figure 12:
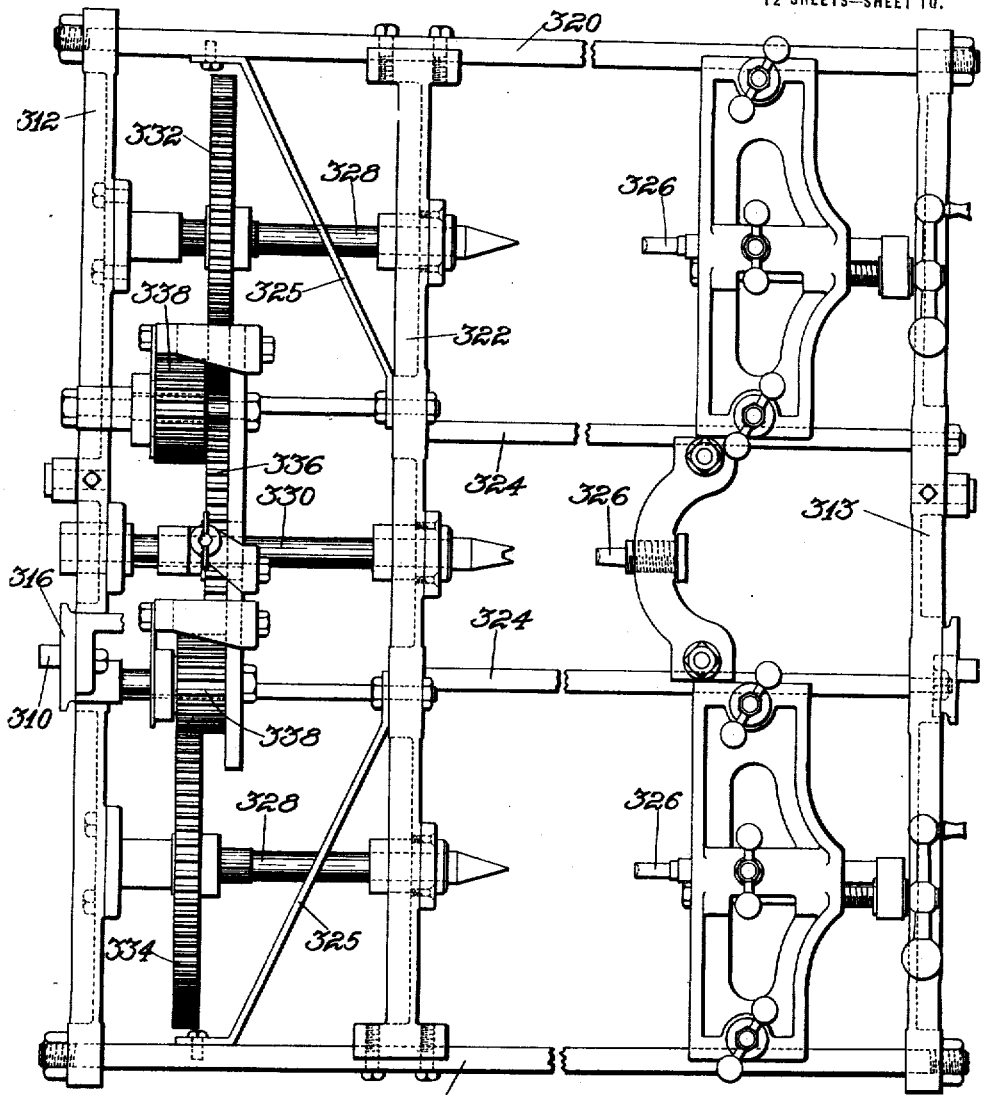
Fig. 12 is a front elevation of the slide frame.
Figure 14:
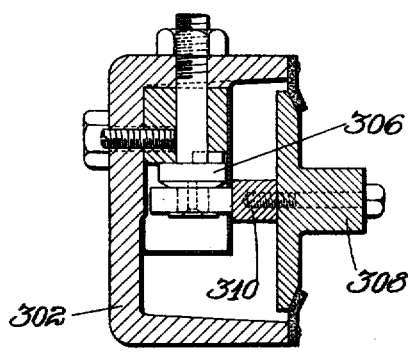
Figs. 14 and 15 are details of the roller bearings.
Figure 13:
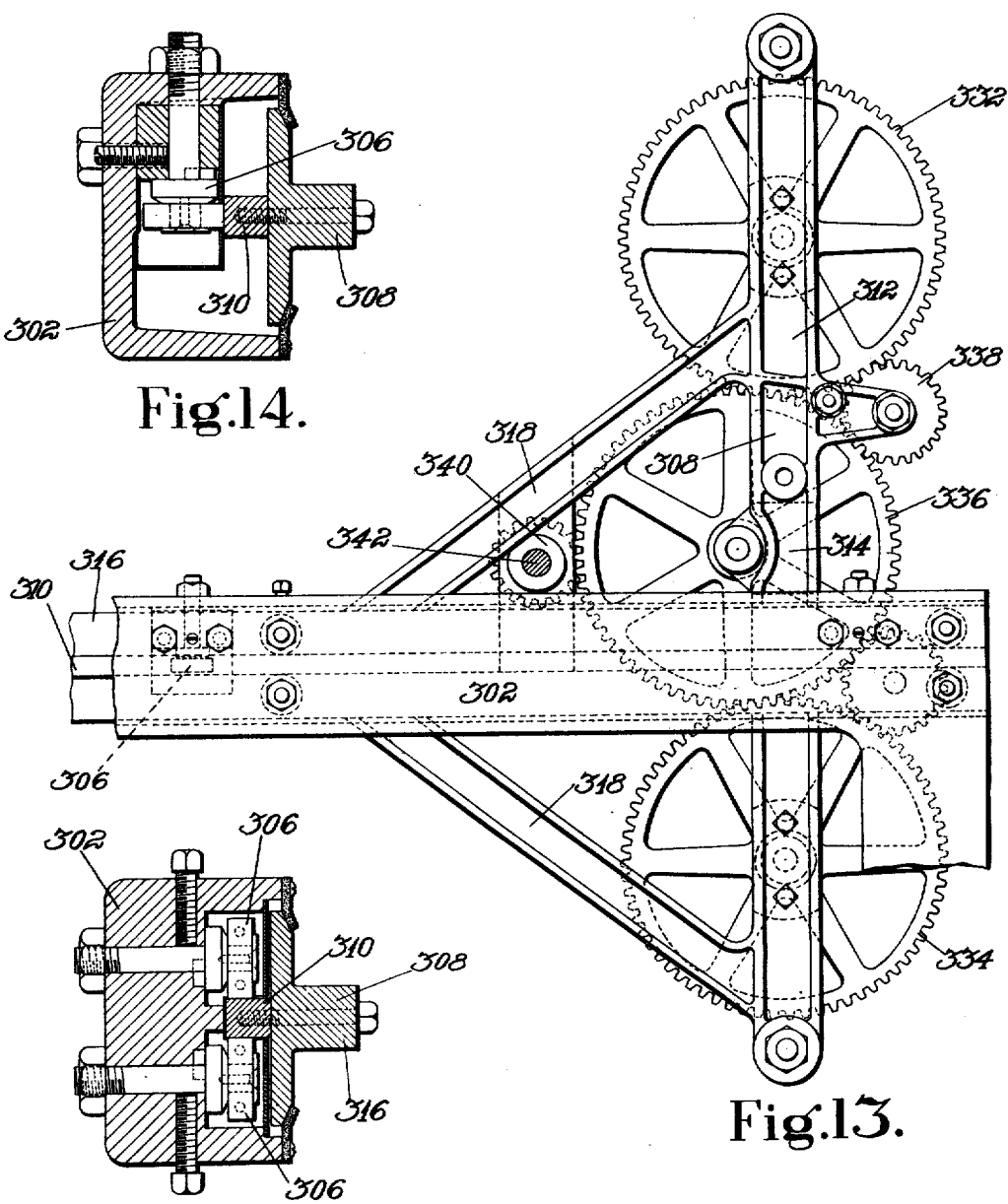
Fig. 13 is a side elevation of the slide frame.
Figure 15:
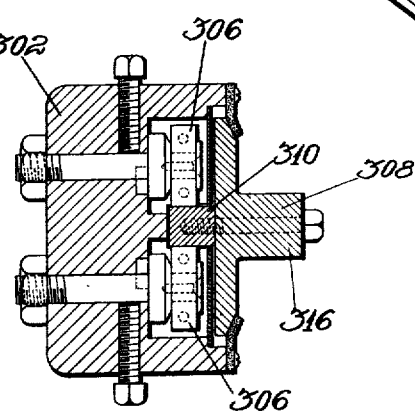

The model carriage has a pillar 422, Fig. 10, in which are mounted two small cutter heads 424, 426, with their axes at an angle of about 30° with the block spindles, and in the planes of movement of these spindles as described in the preceding machine. These cutter heads are driven by the drum 428 on the shaft 376, Fig. 10, belts 430 and 432, the latter connecting the two cutter head shafts. The model wheel 434 is similarly angled, and is about 3½ inches in diameter to exactly match the cutter heads. Its axis is in the plane of movement of the model spindle. The width grading mechanism shown is of the ordinary Gilman last lathe type and need not be described.

The form of slide frame just described can be made much narrower horizontally than the one shown in the first machine, but has to be wider vertically as it has to accommodate three spindles, one above the other. The form of cutter head shown, mounted on the end of its axis, instead of in the middle of it, and with the axis angled to carry it away from the work, is peculiarly adapted to co-operate with this type of slide frame, inasmuch as the model wheel could not be brought up to the frame between two of the old-fashioned 10-inch cutter heads without greatly increasing the vertical width of the frame.

Having thus described the invention, what is claimed as new and desired to be secured by Letters Patent of the United States is:—

1. In a machine of the class described, a slide frame, a model last holding instrumentality and two block holding instrumentalities mounted in the frame, a model wheel arranged to co-operate with a model held by the model holding instrumentality, a single bearing block and two cutter heads having approximately the same diameter as the model last mounted in said bearing block for rotary movement with one end of each exposed, arranged to co-operate with the blocks held by the block holding instrumentalities in opposite senses to cut a right and left last from the blocks respectively.

2. In a machine of the class described, a slide frame, rectilinear guides for the slide frame, two block holding and rotating instrumentalities mounted on the slide frame, two cutter heads having approximately the diameter of a men's model last and mounted with one end of each exposed and having their axes symmetrically arranged relatively to a plane parallel to the plane of the guides, and arranged to operate on blocks held by the block holding instrumentalities, a model holding and rotating means on the slide holding and a model wheel for controlling the frame and a model wheel for controlling the movement of the slide frame relatively to the cutter heads.

3. In a machine of the class described, a slide frame, rectilinear guides upon which the slide frame oscillates, two block holding and rotating means mounted in the slide frame, two cutter heads having a diameter approximately that of a men's model, with their axes located in the planes in which the block holding means move as the slide frame slides on the guides, and inclined acutely toward the direction of relative feeding travel of the cutter with their ends nearer the work exposed to act thereon, model holding and rotating means mounted in the slide frame above one of the block holding means, and a model wheel similarly arranged relatively to the corresponding cutter head, with its axis parallel to that of the cutter head.

4. In a machine of the class described, model holding and model contacting means, block holding and block treating means, two carriages each carrying one means of each pair, means for driving a carriage and a wedge connecting one carriage to the other for transmitting movement from one to the other.

5. In a machine of the class described, model holding and model contacting means, block holding and block treating means, two carriages each carrying one means of each pair, means for driving a carriage and a wedge mounted on a carriage for transmitting movement from one carriage to the other.

6. In a machine of the class described, model holding and model contacting means, block holding and block treating means, two carriages each carrying one means of each pair, means for driving a carriage and a wedge connecting them for transmitting movement from one to the other, and constructed and arranged to alter the distance between the carriages during the last cutting.

7. In a machine of the class described, model holding and model contacting means, block holding and block treating means, two carriages each carrying one means of each pair, means for driving a carriage, and mechanism having its ends connected to the carriages respectively and comprising a wedge arranged to transmit the drive and to alter the distance between the ends of the connecting means during the last cutting.

8. In a machine of the class described, model holding and model contacting means, block holding and block treating means, two carriages each carrying one means of said pair, means for driving a carriage, and a connecting means for the carriages comprising a wedge moving transversely to the line of travel of the carriages to alter their distance as the cutting proceeds.

9. In a machine of the class described, model holding and model contacting means, block holding and block treating means, two carriages each carrying one means of said pair, means for driving a carriage and connecting means for transmitting movement from one carriage to the other comprising an adjustably angled wedge.

10. In a machine of the class described, model holding and model contacting means, block holding and block treating means, two carriages each carrying one means of said pair, means for driving a carriage, two members, one connected to each carriage, and a connecting means for the members comprising an adjustably angled wedge moving transversely to the members to alter their distance as the cutting proceeds.

11. In a machine of the class described, model holding and model contacting means, block holding and block treating means, two carriages arranged to move in parallel directions, and each carrying one means of each pair, a frame connecting the carriages and comprising members having rectilinear translatory relations with the carriages respectively, said members being adjustable into or out of parallelism to control the relative movement of the carriages.

12. In a machine of the class described, model holding and model contacting means, block holding and block treating means, two carriages each carrying one means of each pair and arranged to move in parallel directions, two members having rectilinear translatory relations with the carriages respectively in a direction transverse to the line of movement of the carriages, but confined to the carriages as regards movement in the line of travel, said members being connected to move together transverse to the line of travel, the connection being adjustable as to the angle between the members whereby the relative movement of the carriages can be controlled.

13. In a machine of the class described, model holding and model contacting means, block holding and block treating means, two carriages each carrying one means of each pair and arranged to move in parallel directions, guides connected to each carriage, respectively, and arranged transverse to the direction of movement, a slide in each guide, one of said guides being angularly adjustable relatively to its carriage, the slides being fixedly connected as regards relative movement transverse to the said direction of carriage movement, but relatively angularly adjustable corresponding to the angular adjustability of the said guides, and means for moving the slides upon the guides during the cutting of a last.

14. In a machine of the class described, model holding and model contacting means, block holding and block treating means, two carriages each carrying one means of each pair and arranged to move in parallel directions, a frame comprising two slide bars relatively adjustable between limits each side of parallelism, and guides connected to the carriages and engaging the slide bars respectively whereby movement may be transmitted from one carriage to the other, and uniformly modified in transmission.

15. In a machine of the class described, model holding and model contacting means, block holding and block treating means, two carriages each carrying one means of each pair and arranged to move in parallel directions, two guides connected to the carriages, a frame comprising two slide bars mounted in the guides respectively and relatively adjustable as to the angle between them, means for moving the frame whereby the guides may be caused to approach or recede from each other.

16. In a machine of the class described, model holding and model contacting means, block holding and block treating means, two carriages each carrying one means of each pair, means for driving a carriage and connecting means extending between the carriages for transmitting the drive from one to the other, comprising a wedge through which the driving force is transmitted.

17. In a machine of the class described, model holding and model contacting means, block holding and block treating means, two carriages, each carrying one means of each pair, means for driving a carriage, a transverse guide and a longitudinal guide on one carriage, a second transverse guide mounted on the longitudinal guide and connected to the other carriage, a slide bar in each guide, one guide being angularly adjustable to bring said slide bars into or out of parallelism, said bars being connected for simultaneous movement, and means for driving the bars in the slides whereby the distance between the carriages may be altered during the last cutting.

18. In a machine of the class described, model holding and model contacting means, block holding and block treating means, two carriages each carrying one means of said pair, and a connection between the carriages, transmitting the drive from one to the other, said connection comprising a wedge driven transversely to the line or drive to alter the effective length of the connection.

19. In a machine of the class described, model holding and model contacting means, block holding and block treating means, two carriages each carrying one means of said pair, and a connection between the carriages, transmitting the drive from one to the other, and a wedge driven transversely to the line of drive to alter the effective length of the connection.

In testimony whereof I have signed my name to this specification.

FRANK S. BUCK.